US010693576B2

(12) United States Patent
Blokh et al.

(10) Patent No.: US 10,693,576 B2
(45) Date of Patent: Jun. 23, 2020

(54) CARRIER FREQUENCY OFFSET MODELING FOR RADIO FREQUENCY FINGERPRINTING

(71) Applicant: LEVL TECHNOLOGIES, INC., Palo Alto, CA (US)

(72) Inventors: Dmitry Blokh, Rishon Lezion (IL); Michael Estrin, Rishon Lezion (IL); Daniel Zahavi, Rishon Lezion (IL)

(73) Assignee: LEVL TECHNOLOGIES, INC., Palo Alto, CA (US)

( * ) Notice: Subject to any disclaimer, the term of this patent is extended or adjusted under 35 U.S.C. 154(b) by 0 days.

(21) Appl. No.: 16/551,914

(22) Filed: Aug. 27, 2019

(65) Prior Publication Data

US 2020/0067616 A1 Feb. 27, 2020

Related U.S. Application Data

(60) Provisional application No. 62/723,039, filed on Aug. 27, 2018.

(51) Int. Cl.
*H04B 17/391* (2015.01)
*G06N 20/00* (2019.01)
*H04B 1/38* (2015.01)

(52) U.S. Cl.
CPC ........... *H04B 17/391* (2015.01); *G06N 20/00* (2019.01); *H04B 1/38* (2013.01)

(58) Field of Classification Search
CPC .................................................. H04B 17/391
(Continued)

(56) References Cited

U.S. PATENT DOCUMENTS 5,893,031 A 4/1999 Hoogerwerf et al.
9,613,475 B2 4/2017 Zivkovic et al.
(Continued)

FOREIGN PATENT DOCUMENTS

CN 102693411 A 9/2012
CN 202906963 U 4/2013
(Continued)

OTHER PUBLICATIONS

Burzigotti, et al. (2010). Advanced receiver design for satellite-based AIS signal detection. pages 1-8.
(Continued)

*Primary Examiner* — Peter G Solinsky
(74) *Attorney, Agent, or Firm* — The Roy Gross Law Firm, LLC; Roy Gross

(57) ABSTRACT

A method comprising operating at least one hardware processor for: receiving, by a radio frequency (RF) receiver, a plurality of training RF transmissions from an RF device, wherein each of said training RF transmissions is temporally associated with operational parameters and ambient parameters of said RF receiver and said RF device; at a training stage, training a machine learning classifier based, at least in part, on a training set comprising: (i) a Carrier Frequency Offset (CFO) value calculated for each of said training RF transmissions, and (ii) labels associated with said operational parameters and said ambient parameters; and at an inference stage, applying said machine learning classifier to determine whether one or more runtime RF transmissions originate from said RF device.

20 Claims, 3 Drawing Sheets

(58) Field of Classification Search
USPC .......................................................... 370/252
See application file for complete search history.

(56) References Cited

U.S. PATENT DOCUMENTS

| | | | |
|---|---|---|---|
| 9,893,886 B2 | 2/2018 | Tercero | |
| 2004/0120412 A1 | 6/2004 | Banerjea | |
| 2006/0273888 A1 | 12/2006 | Yamamoto | |
| 2007/0105520 A1 | 5/2007 | Van Houtum | |
| 2007/0264939 A1 | 11/2007 | Sugar | |
| 2009/0154627 A1* | 6/2009 | Park | H04L 27/2659 |
| | | | 375/365 |
| 2010/0067546 A1 | 3/2010 | Mishra et al. | |
| 2010/0254475 A1 | 10/2010 | Kawauchi et al. | |
| 2017/0046299 A1* | 2/2017 | Isaac | G06F 13/4068 |
| 2017/0328979 A1 | 11/2017 | Franke et al. | |
| 2018/0212635 A1 | 7/2018 | Wicaksana et al. | |
| 2019/0373537 A1* | 12/2019 | Trainin | H04W 16/28 |

FOREIGN PATENT DOCUMENTS

| | | |
|---|---|---|
| CN | 106961434 A | 7/2017 |
| EP | 2744162 B1 | 6/2015 |
| IN | 2005DE00388 A | 12/2006 |
| WO | 2014015970 A1 | 1/2014 |
| WO | 2017157563 A1 | 9/2017 |

OTHER PUBLICATIONS

Chang, Dah-Chung. (2009). Least Squares/Maximum Likelihood Methods for the Decision-Aided GFSK Receiver. IEEE Signal Processing Letters, vol. 16, No. 6, Jun. 2009, pp. 517-520.
Mikhail B Tadjikov. (2010). Examination of Techniques for Carrier Frequency Estimation of Frequency Hopped Signals in Time Domain. A report submitted in partial satisfaction of the requirements for the degree Master of Science in Electrical Engineering. University of California, pp. 1-41.
Yan et al. (2013). ZIMO: Building cross-technology MIMO to harmonize zigbee smog with WiFi flash without intervention. Proceedings of the Annual International Conference on Mobile Computing and Networking, MOBICOM. pp. 465-476.
Chatterjee, et al. (2018). RF-PUF: Enhancing IoT Security through Authentication of Wireless Nodes using In-situ Machine Learning.
Polak, et al. (2011). Identifying Wireless Users via Transmitter Imperfections. Selected Areas in Communications, IEEE Journal on. 29. pp. 1469-1479.
Hanif Rahbari (2016). Obfuscation of Transmission Fingerprints for Secure Wireless Communications. Electronic Dissertation. Department of Electrical and Computer Engineering. The University of Arizona. pp. 1-171.
Rehman, et al. (2014). Radio frequency fingerprinting and its challenges. 2014 IEEE Conference on Communications and Network Security, CNS 2014, pp. 496-497.
Vo-Huu, et al. (2016). Fingerprinting Wi-Fi devices using software defined radios. In Proceedings of the 9th ACM Conference on Security & Privacy in Wireless and Mobile Networks. ACM, pp. 3-14.
Wang, et al. (2012). Watchdog Sensor Network with Multi-Stage RF Signal Identification and Cooperative Intrusion Detection. https://apps.dtic.mil/dtic/tr/fulltext/u2/a574098.pdf.
Phylaws (Id 317562), FP7-ICT-2011-call8, Security Solutions utilizing Physical Communication Layer, pp. 24-60, 2012.
Ignacio Fernández Hernández. (Jun. 2015). Thesis. Snapshot and Authentication Techniques for Satellite Navigation.
Psiaki, et al. (2016). GNSS Spoofing and Detection. Proceedings of the IEEE, 104(6), 1258-1270.
Hou, Weikun, et al. "Physical Layer Authentication in OFDM Systems Based on Hypothesis Testing of CFO Estimates." IEEE International Conference on Communications (ICC), pp. 3559-3563. IEEE, 2012. Jun. 10, 2012 (Jun. 10, 2020).
Raboh, Mohamed S. Abd, et al. "Carrier Frequency Offset (CFO) Estimation Methods, A Comparative Study." (2015) Aerospace Sciences and Aviation Technology, ASAT. May 26-28, 2015.
Riyaz, Shamnaz Mohammed. "Radio Fingerprinting Using Convolutional Neural Networks." PhD diss., Northeastern University, 2018. Retrieved from the Internet: <URL: https://search.proquest.com/openview/78c8d5cb335b09d89ba51e28412473a6/1?cbl=18750&diss=y&pq-origsite=gscholar> Jul. 31, 2018 (Jul. 31, 2018).
Vo-Huu, Tien Dang, et al. "Fingerprinting Wi-Fi Devices Using Software Defined Radios." Proceedings of the 9th ACM Conference on Security & Privacy in Wireless and Mobile Networks, pp. 3-14. 2016. Jul. 18, 2016 (Jul. 18, 2016).
International Search Report, International Application No. PCT/IB2019/057207, dated Nov. 26, 2019.
International Search Report, International Application No. PCT/IB2019/058170, dated Jan. 27, 2020.
Notice of References Cited, U.S. Appl. No. 15/585,720, dated 12 Nov. 2019.

* cited by examiner

CARRIER FREQUENCY OFFSET MODELING FOR RADIO FREQUENCY FINGERPRINTING

CROSS REFERENCE TO RELATED APPLICATIONS

This application claims the benefit of priority from U.S. Provisional Patent Application No. 62/723,039, filed on Aug. 27, 2018, entitled "CARRIER FREQUENCY OFFSET MODELING FOR RADIO FREQUENCY FINGERPRINTING", the contents of which are incorporated by reference herein in their entirety.

FIELD OF THE INVENTION

The invention relates generally to the field of wireless communication systems.

BACKGROUND OF THE INVENTION

The use of wireless communication systems and their interconnections via networks have grown rapidly in recent years. Because radio frequency (RF) waves can penetrate obstacles, wireless devices can communicate with no direct line-of-sight between them. This makes RF communication easier to use than wired or infrared communication. For example, billions of Bluetooth devices, such as laptops, smartphones, computer peripherals, headsets, and handsfree devices, are widely used all over the world.

However, wireless RF communication is also easier to hack and disrupt than wired communication. Because wireless RF communication can suffer from these threats, additional countermeasures are needed to protect against them.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a method comprising operating at least one hardware processor for: receiving, by a radio frequency (RF) receiver, a plurality of training RF transmissions from an RF device, wherein each of said training RF transmissions is temporally associated with operational parameters and ambient parameters of said RF receiver and said RF device; at a training stage, training a machine learning classifier based, at least in part, on a training set comprising: (i) a Carrier Frequency Offset (CFO) value calculated for each of said training RF transmissions, and (ii) labels associated with said operational parameters and said ambient parameters; and, at an inference stage, applying said machine learning classifier to determine whether one or more runtime RF transmissions originate from said RF device.

There is also provided, in an embodiment, a system comprising: at least one radio frequency (RF) receiver; at least one hardware processor; and a non-transitory computer-readable storage medium having stored thereon program instructions, the program instructions executable by the at least one hardware processor to: receive, by a radio frequency (RF) receiver, a plurality of training RF transmissions from an RF device, wherein each of said training RF transmissions is temporally associated with operational parameters and ambient parameters of said RF receiver and said RF device; at a training stage, train a machine learning classifier based, at least in part, on a training set comprising: (i) a Carrier Frequency Offset (CFO) value calculated for each of said training RF transmissions, and (ii) labels associated with said operational parameters and said ambient parameters; and at an inference stage, apply said machine learning classifier to determine whether one or more runtime RF transmissions originate from said RF device.

There is further provided, in an embodiment, a computer program product comprising a non-transitory computer-readable storage medium having program instructions embodied therewith, the program instructions executable by at least one hardware processor to: receive, by a radio frequency (RF) receiver, a plurality of training RF transmissions from an RF device, wherein each of said training RF transmissions is temporally associated with operational parameters and ambient parameters of said RF receiver and said RF device; at a training stage, train a machine learning classifier based, at least in part, on a training set comprising: (i) a Carrier Frequency Offset (CFO) value calculated for each of said training RF transmissions, and (ii) labels associated with said operational parameters and said ambient parameters; and at an inference stage, apply said machine learning classifier to determine whether one or more runtime RF transmissions originate from said RF device.

In some embodiments, each of said training RF transmissions is labelled with said temporally associated operational parameters and ambient parameters.

In some embodiments, said training further comprises generating one or more CFO profiles for said RF device, wherein each of said CFO profiles comprises said calculated CFO values, and wherein said determining is based, at least in part, on calculating a distance metric between a measured CFO value of said runtime RF transmissions and said one or more CFO profiles.

In some embodiments, said operational parameters and said ambient parameters of said RF receiver and said RF device are selected from the group consisting of: Operating temperatures, ambient temperature, ambient relative humidity, RF channel used for transmitting said RF transmissions, and a connectivity state of one or more wireless transceivers.

In some embodiments, said operating temperatures include at least some of Central Processing Unit (CPU) temperature, Graphic Processing Unit (GPU) temperature, and battery temperature.

In some embodiments, at least some of said plurality of operational parameters are initiated in said RF device, based, at least in part, on instructions transmitted from said RF transceiver, wherein said instructions further cause said RF device to transmit at least one training RF transmission during said initiating.

In some embodiments, said machine learning classifier is further trained based, at least in part, on a training set comprising: (i) CFO values calculated for at least some of said runtime RF transmission, and (ii) labels associated with operational parameters and ambient parameters temporally associated with each of said at least some runtime RF transmissions.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1A:
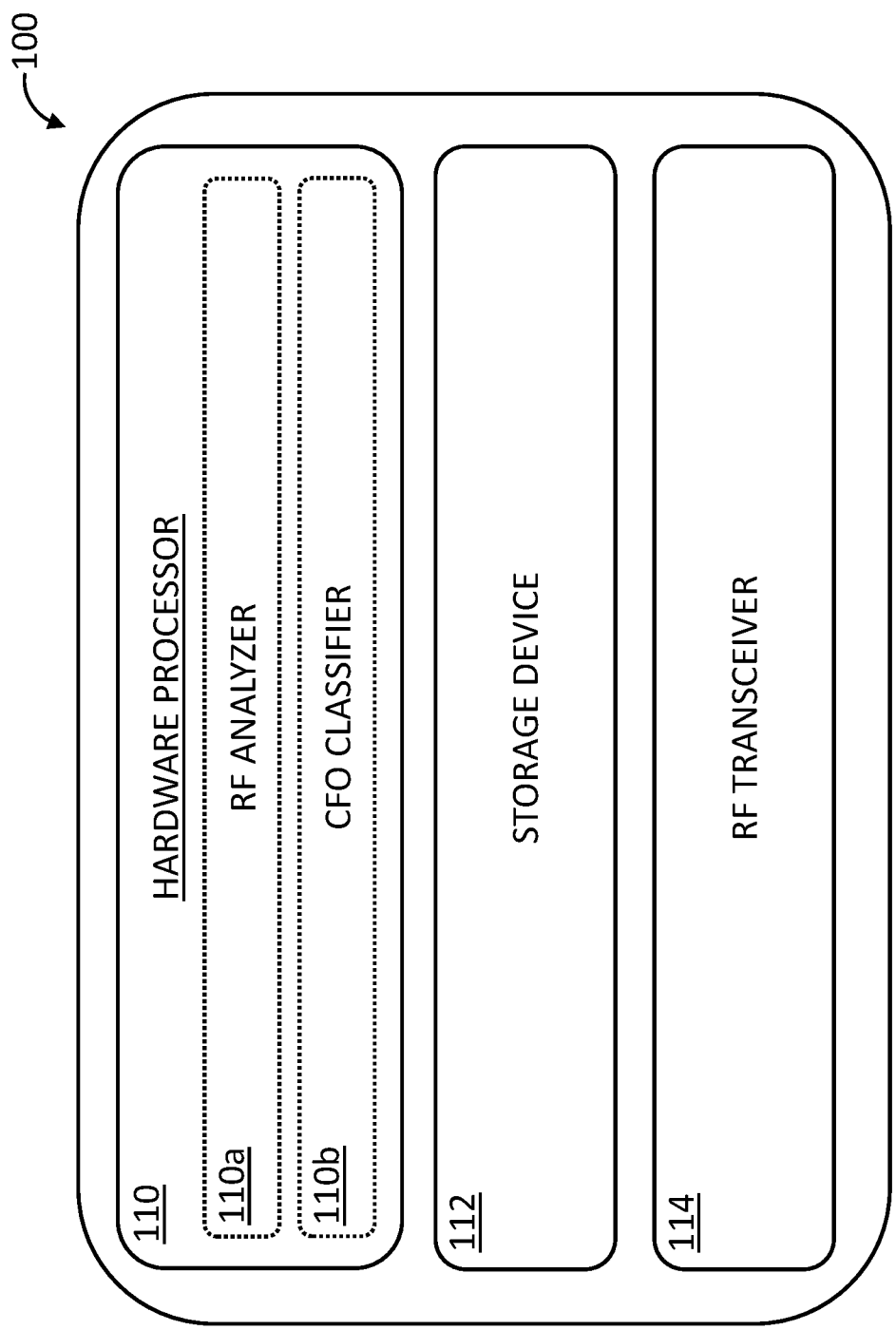
FIG. 1A is a block diagram of an exemplary system for identification and authentication of a radio frequency (RF) device based on Carrier Frequency Offset, according to an embodiment.

Disclosed herein are a system, method, and computer program product for the modelling of expected Carrier Frequency Offset (CFO) values in radio frequency (RF) devices, based on a variety of operational and/or ambient conditions.

CFO is a common anomaly in transmitting devices, which often occurs when a local oscillator signal in the receiver does not synchronize with the carrier signal contained in the received signal. As a result, the received signal may be shifted in frequency. This phenomenon can be attributed to two main factors: frequency mismatch in the transmitter and the receiver oscillators, and the Doppler effect as the transmitter and/or the receiver are moving.

Because CFO is a device-specific trait, it may be leveraged for use in device fingerprinting authentication. Specifically, the frequency mismatch in the transmitter and the receiver oscillators can be measured and used in constructing a device RF fingerprint. However, using CFO as a component of an RF fingerprint of a device may still present challenges, because individual RF devices may exhibit variations in their unique CFO, due mainly to operational and/or ambient conditions, which may include, but are not limited to:

Device temperature(s), as may be measured by multiple device sensors,
ambient conditions such as temperature, relative humidity, etc.,
RF channel used for transmission,
receiver device temperature(s), and
wireless connectivity state (i.e., on/off) of various wireless communication elements within the device, including Wi-Fi, cellular band, and/or other wireless transceivers.

Because of these variations in device-level CFO measured values, simple CFO-based fingerprinting authentication may lead to inconclusive results.

Accordingly, in some embodiments, the present invention provides for an algorithm configured for calculating an expected 'true' CFO value for an RF device, regardless of operational and/or ambient conditions. The expected CFO value calculated for an RF device may then be used, alone or with other elements, in constructing a more accurate RF fingerprint for identification and authentication of the device.

In some embodiments, the algorithm of the present invention may be based, at least in part, on training a machine learning classifier using, for each RF device, a training set comprising a plurality of data packets received from the RF device under a variety of operational and/or ambient conditions, wherein each data packet may be labelled with the operational and/or ambient conditions corresponding to its transmission. The algorithm may then generate and store, in a dedicated database of profiles, one or more CFO profiles associated with each RF device on which the classifier was trained.

In some embodiments, following the training stage, the algorithm may be configured for predicting if one or more data packets received from an RF device were transmitted by a known RF device, based, at least in part, on the one or more CFO profiles associated with the device and stored in the database of CFO profiles. In some embodiments, a system of the present invention may be configured for using such predictions as part of fingerprinting authentication of an RF device. In some embodiments, the fingerprinting authentication may be based on the predicted CFO value alone, or in combination with one or more other RF fingerprinting parameters.

A potential advantage of the present invention is, therefore, in that it may provide for a quick, reliable, and efficient identification and authentication of an RF device, based upon calculating an accurate CFO value for the device, regardless of its operating and/or ambient conditions. The disclosed invention is easy to use and cost effective, does not require any additional hardware, and has no significant negative effect on the size, power consumption, and/or price of the RF device being authenticated.

The term "RF" is used herein broadly, to include all signals transmitted as free-space electromagnetic radiation or emission in all frequency bands used in communications, and according to a wide variety of RF communication protocols. In some embodiments, the present invention may be applied with respect to one or more local area networks and/or personal area network protocols, including, but not limited to, Bluetooth, Bluetooth Low Energy (BLE), Zig-Bee, and/or Wi-Fi.

"RF fingerprint" refers to idiosyncratic inherent traits, characteristics, and/or features of an individual RF device. These small differences are device-specific, even among devices of the same model, and manifest themselves as artifacts of emitted signals. They may be attributed to, e.g., component manufacturing tolerances, device age, etc. In some cases, these traits, characteristics, and/or features may be sufficiently unique, either individually or in combination, that they can be used to identify that device. Because RF fingerprints are difficult to clone, they may be exploited to obtain reliable and efficient electronic fingerprints and signatures from RF devices. These, in turn, may play a significant role in improving the security of many RF transmission protocols, e.g., for identification and authentication purposes. For example, by obtaining and storing the unique fingerprints of RF devices in a network, each device can be positively identified and authenticated within the network, thereby thwarting attempts to infiltrate the network with an unauthorized device attempting to impersonate an authorized device. In another example, RF fingerprints may also help to avoid relay attacks, because a relay device attempting to impersonate a legitimate device will, by necessity, have a slightly different RF fingerprint which may be detected by the receiving device.

Accordingly, a system of the present invention may be used, e.g., in the context of a wireless communications network, for identifying and authenticating authorized network devices. For example, when a new device first joins the network, one or more existing network devices may perform a training stage for constructing one or more CFO profiles for the new device. The CFO profiles may then be stored, together with all other existing network profiles, in a network-wide database of authorized CFO profiles. Thereafter, whenever the device attempts to connect to the network, the one or more stored CFO profiles of the device will be matched against runtime CFO values acquired from the device, to permit or deny network service or login to the device.

FIG. 1A is a block diagram of an exemplary system 100 for identification and authentication of an RF device based, at least in part, on a calculated expected CFO value for the device. System 100 as described herein is only an exemplary embodiment of the present invention, and in practice may have more or fewer components than shown, may combine two or more of the components, or a may have a different configuration or arrangement of the components. The various components of system 100 may be implemented in hardware, software or a combination of both hardware and software. In various embodiments, system 100 may comprise one or more dedicated hardware devices, or may form an addition to or extension of an existing device.

In some embodiments, system 100 may comprise a hardware processor 110, which may include an RF analyzer 110a and a CFO classifier 110b; a non-transitory computer-readable memory storage device 112; and an RF transceiver 114 configured for handling both transmitted and received RF signals. System 100 may store in storage device 112 software instructions or components configured to operate a processing unit (also "hardware processor," "CPU," or simply "processor"), such as hardware processor 110. In some embodiments, the software components may include an operating system, including various software components and/or drivers for controlling and managing general system tasks (e.g., memory management, storage device control, power management, etc.), and facilitating communication between various hardware and software components. In addition, system 100 may include such other components as one or more antenna elements, digital-to-analog (DAC) converters, amplification modules, and the like. In other embodiments, system 100 may also contain one or more accelerometers, a Global Positioning System (GPS) receiver and related circuitry, and data transmission circuitry, such as a Wi-Fi transceiver.

In some embodiments, system 100 may be any network device or node used to authenticate one or more devices as they communicate. For instance, system 100 can be a wireless access point or a cellular base station. The communication network or networks can include any wireless communication network such as a mobile data network, a cellular voice and data network, a wireless local area network (e.g., WiFi or an 802.xx network), a satellite communications network, a personal area network, or any other wireless network. The communication devices can include any network edge device, bridge device or home gateway, a mobile communication device, laptop computer, tablet, smartphone, smart watch, or any other communication device.

In some embodiments, as noted above, system 100 may be implemented as software instructions being executed on one or more devices within a network, wherein each system 100 device may comprise any network device or node. In such cases, the computational tasks of constructing CFO profiles for network devices may be shared by one or more of the system 100 devices, so as to divide overall computational load.

In some embodiments, CFO classifier 110b may employ a variety of algorithms and methods, such as Principal Component Analysis (PCA), neural network applications, convolutional neural networks (CNNs), support vector machine (SVM) models, Self-Organizing Maps, Learning Vector Quantization (LVQ) methods, Discrete Wavelet Transform (DWT) parameters, a Bayesian filter, clustering algorithms such as expectation maximization (EM), k—means, density-based spatial clustering of applications with noise (DBSCAN), and/or a Kalman filter.

Figure 1B:
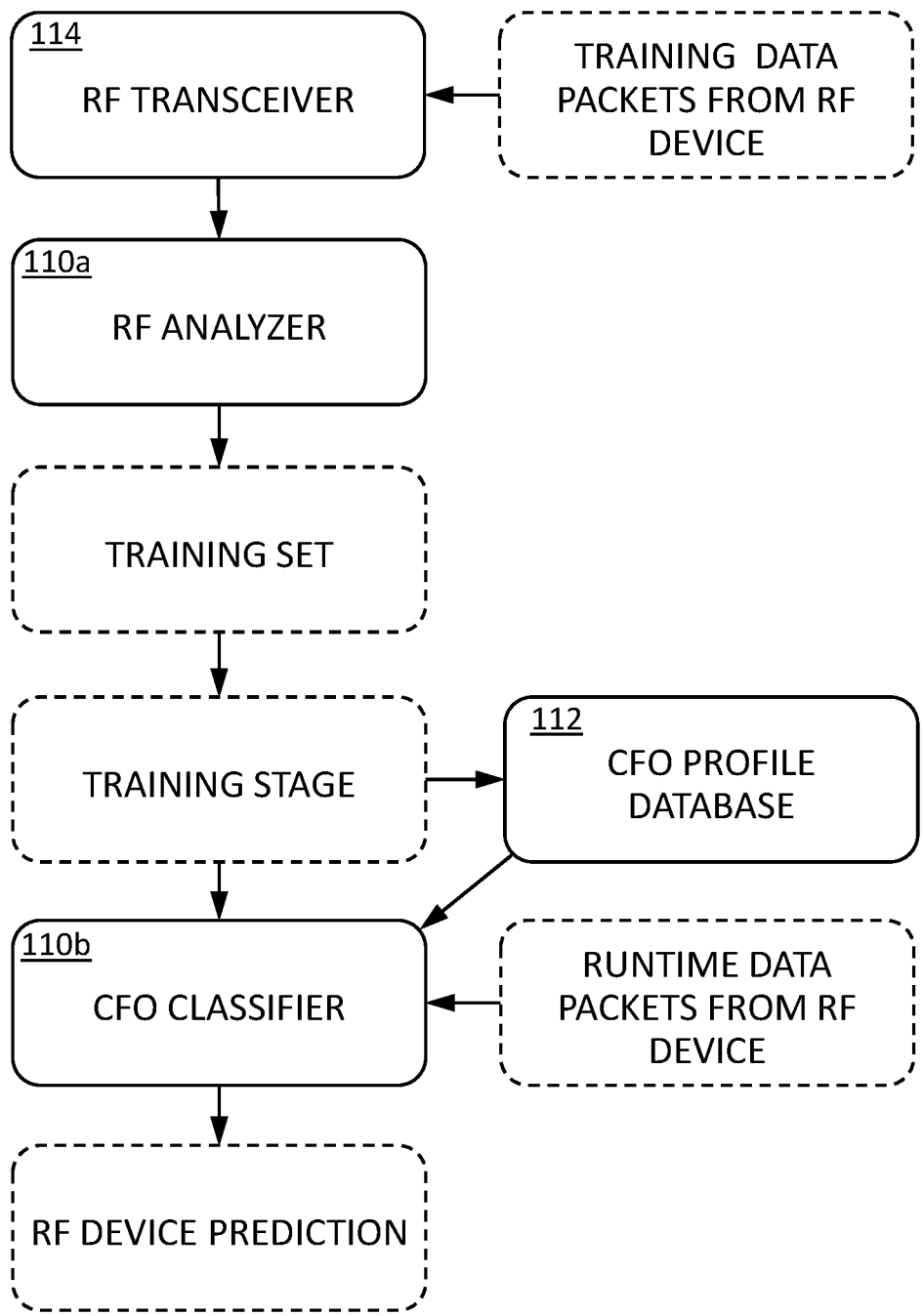
FIG. 1B is a flowchart of a process for identification and authentication of a radio frequency (RF) device based on Carrier Frequency Offset, according to an embodiment.

An overview of the functional steps in a process for training an algorithm for predicting expected CFO values for RF devices, using a system such as system 100, will now be provided with reference to the block diagram in FIG. 1B.

Figure 2:
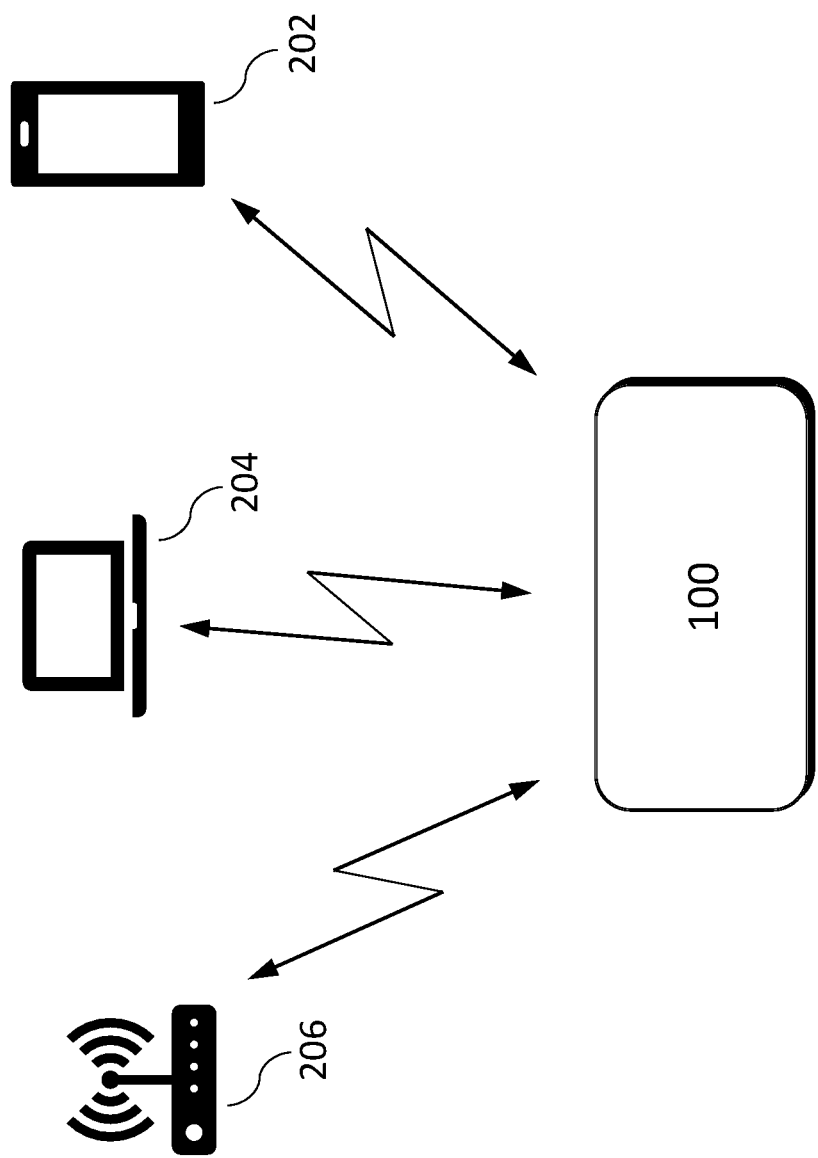
FIG. 2 schematically illustrate data acquisition for generating a training set for an exemplary system for identification and authentication of a radio frequency (RF) device based on Carrier Frequency Offset, according to an embodiment.

In some embodiments, as schematically illustrated in FIG. 2, at a training stage, system 100, which may comprise one or more network devices, may be configured for generating one or more training sets. Each training set in turn may corresponding to an RF device, for example, smartphone 202, laptop computer 204, and/or router 206.

In some embodiments, a training set for an RF device comprises a plurality of data packets transmitted by the RF device and received through RF transceiver 114, under a variety of operational and/or ambient conditions of the RF device. In some embodiments, a training set may comprise between 500 and 5,000 data packets, associated with a range of device operating temperature(s), RF channels used for transmission, wireless connectivity states, receiver device temperature(s), and/or other operational and/or ambient parameters. In other embodiments, fewer or more data packets and/or other data elements may be used for constructing each training set.

In some embodiments, RF analyzer 110a may be configured for processing and analyzing a variety of parameters and features with respect to the plurality of data packets received by RF transceiver 114. Such parameters and features may include, but are not limited to, CFO parameters, phase parameters, frequency parameters, and/or amplitude parameters.

In some embodiments, system 100 may be configured, during the training stage, for actively initiating specified operational conditions in one or more devices of system 100, and/or in at least some of RF devices 202, 204, 206. Thus, system 100 may ensure that each training set represents a wide range of operational conditions for both the receiving and transmitting devices. The active initiation of specified operational conditions may be carried out through software instructions executed on one of more devices of system 100, and/or a dedicated software application installed on one or more RF device 202, 204, 206. System 100 may then be configured for temporally associating these operational conditions with corresponding data packets transmitted during the training stage.

In some embodiments, the actively initiated operational conditions may include, but are not limited to, altering a device's wireless connectivity state, by, e.g., turning its Wi-Fi and/or other wireless transceivers on or off, such that the data packets are transmitted in various connectivity states. In another example, the application may be configured for initiating, e.g., battery heating in a receiving and/or transmitting device, by providing suitable instructions to the device's operating system, to alter the operating temperatures of the device. Accordingly, the application may cause the operation system of a device to heat the battery, CPU, Graphic Processing Unit (GPU), and/or other components of the device, e.g., by running simulated processing tasks. Thus, the device may experience operational temperatures ranging from room temperature to approximately 35°-40° C. In yet other examples, the application may be configured for initiating additional and/or other operational states in the device.

In some embodiments, the application may be configured for providing to system 100 operational data with respect to the RF device, which data correspond to each transmitted data packet. For example, such data may include, but are not limited to, wireless connectivity state (on/off) of various transceivers within the device; RF channel used in each transmission; and/or RF device temperatures collected from a plurality of sensors, including, but not limited to, CPU, GPU, and battery temperature. In other embodiments, additional and/or other data may be used, including data acquired from a variety of sensors within the RF device.

In some embodiments, CFO classifier 110b may be configured for providing, during the training stage, ongoing instructions to the application regarding the number, type, and/or operational characteristics of the training data packets to be transmitted by the RF device. For example, CFO classifier 110b may instruct the application to turn off the Wi-Fi transceiver of the RF device for a specified number of data packets, until classifier 110b has obtained a sufficient amount of data to calculate a model for the 'off' state of the Wi-Fi transceiver, and then instruct the application to turn the Wi-Fi transceiver on, until a sufficient amount of data to calculate a model for the 'on' state of the Wi-Fi transceiver has further been obtained.

In some embodiments, CFO classifier 110b may further be configured for sending to the RF device simulated data requests to cause the RF device to transmit data packets, in addition to, or in lieu of, the data packets generated by the dedicated application described above.

In some embodiments, following the training stage, CFO classifier 110b may be further configured for ongoing, continuous updating of the classification model with respect to an RF device, based, at least in part, on additional runtime data packets received from the RF device. This may enable, e.g., obtaining data associated with device operating parameters which may not be readily initiated and/or replicated during the training stage, as well as in connection with a wide range of ambient conditions which may be time- and place-dependent, such as (e.g., different weather as seasons change; different climes in various geographies).

In some embodiments, CFO classifier 110b may be further configured for taking account of different operational idiosyncrasies, sensor types, and/or sensor data resolutions in various RF devices. For example, in different devices, temperature sensors may report CPU, GPU, and/or battery temperatures in different resolutions (e.g., in steps of 0.1°, 0.5°, or 1° C.). In addition, temperature sensors may react differently to device heating scenarios. For example, CPU and GPU sensors of some devices may indicate ~70° C. after only a few seconds of heating, whereas in other devices, the sensor indication may only slowly rise to ~50° C. Furthermore, there may be consistent gaps between the temperature readings of the various sensors within a device, and these gaps may vary among different devices. All these temperature and sensor data irregularities and variations may be useful in constructing and continuously refining the RF fingerprint of a device.

In some embodiments, CFO classifier 110b may be configured for extracting, in the learning stage, one or more expected CFO profiles of an RF device based, at least in part, on measured CFO in each data packet, in combination with a plurality of operational and/or ambient parameters data associated with each data packet.

In some embodiments, CFO classifier 110b may be configured for calculating an expected CFO value with respect to each data packet, by solving a linear equation for every data packet. In some embodiments, CFO classifier 110b may be further configured for calculating separate linear combinations of these parameters, one for each connectivity state of the RF device (e.g., Wi-Fi on/off, 4G on/off).

In some embodiments, the linear equation for the expected CFO values may be represented as:

$$CFO = \beta_{intercept} + \left(\sum_{l=1}^{K} \beta_{sensor_{tx_l}} \cdot temp_{sensor_{tx_l}}\right) + (\beta_{channel} * channel) + \left(\sum_{l=1}^{L} \beta_{sensor_{rx_l}} \cdot temp_{sensor_{rx_l}}\right) + \varepsilon,$$

where $temp_{sensor_{tx_l}}$ is the temperature of an $l^{th}$ sensor in the transmitting device, channel is the RF channel number in which the signal was transmitted, and temperature of an $l^{th}$ sensor in the receiving device.

In some embodiments, the linear equation may include elements of higher order, e.g., beta*$(temp_{sensor_x})^2$, beta*$(temp_{sensor_x})^3$, etc.

Accordingly, the objective is to estimate the linear coefficients:

$$\beta_x, x \in \{intercept, sensor_{tx_l, l \in 1,2,\ldots,K}, channel, sensor_{rx_l, l \in 1,2,\ldots,L}\}.$$

Let n denote the total number of packets, and m denote the total number of features per packet, i.e., the number of elements in the following vector:

$$\left(1, temp_{sensor_{tx_l}}\big|_{l=1}^{K}, channel, temp_{sensor_{rx_l}}\big|_{l=1}^{L}\right).$$

Accordingly, m=K+L+2 may be derived.
Let further:
A denote an n×m matrix of all packets features, wherein A(i,j) is the $j^{th}$ feature of packet i, and wherein this matrix is known is assumed to be known;
Y=$[y_1, y_2, \ldots, y_n]^T$ denote the estimated CFO vector of all the packets;
β=$[\beta_1, \beta_2, \ldots, \beta_m]^T$ denote the corresponding linear coefficients for parameter features in the required solution, such that, e.g., for m=K+L+2, we can derive $$\beta = \left(\beta_{intercept}, \beta_{sensor_{tx_l}}\big|_{l=1}^{K}, \beta_{channel}, \beta_{sensor_{rx_l}}\big|_{l=1}^{L}\right);$$

and
ε=$[\varepsilon_1, \ldots, \varepsilon_n]^T$ denote the estimation noise in each packet.
Then, the following equation may capture the dependency of CFO on the set of features:

$$A \cdot \beta = Y + \varepsilon.$$

In some embodiments, as noted above, CFO classifier 110b may be configured for solving this set of equations (calculating the coefficients vector β), by using the least squares method to derive:

$$\beta = (A^T A)^{-1} A^T Y.$$

In some implementations, to reduce computational loads and preserve memory storage resources, the least square method may be modified by initializing $$B = A^T A = 0, b = A^T Y = 0.$$

Then, for every equation (which, as noted, represents a single data packet), denote the features by $A_i = (A_{i,1}, \ldots, A_{i,m})$, and the CFO by $y = Y_i$, wherein B, b may be updated as $B\mathrel{+}= A_i^T A_i$ and $b\mathrel{+}= A_i^T y$.

After updating B, b for all data packets, the least square result may be finalized by computing $\beta = B^{-1} b$.

Following the creation of the one or more expected CFO profiles for each RF device by CFO classifier 110b, system 100 may be configured for storing, e.g., in a dedicated database of profiles on storage device 112, the expected CFO profiles.

Following the learning stage, in an inference stage, system 100 may be configured for predicting whether one or more runtime data packets received from an RF device can be authenticated as being transmitted from a known device whose CFO profiles are stored in the database of CFO profiles on storage device 112. In some embodiments, such authentication may be based on as few as one data packet, or, e.g., between 10-100 data packets. In some embodiments, this determination has a confidence score based, at least in part, on a calculation of a distance metric between the measured CFO of the runtime data packets and the expected CFO profiles of the RF device. In some embodiments, if the confidence score meets a specified threshold, the RF device is determined to be the authorized device, and the data packets received from the RF device may be used to further refine the CFO profiles of the device, as described above. If, however, the probability is lower than the specified threshold, system 100 may be configured for determining that the device is not a known device. In some embodiments, a confidence score threshold level of system 100 may be adjusted in cases where, e.g., CFO profiles of an RF device constructed during the training stage are based on partial inputs—for example, if one or more device sensors is malfunctioning or unavailable to provide relevant ambient and/or operational parameters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method comprising operating at least one hardware processor for:
   receiving, by a radio frequency (RF) receiver, a plurality of training RF transmissions from an RF device, wherein each of said training RF transmissions is temporally associated with operational parameters and ambient parameters of said RF receiver and said RF device;
   at a training stage, training a machine learning classifier based, at least in part, on a training set comprising:
      (i) a Carrier Frequency Offset (CFO) value calculated for each of said training RF transmissions, and
      (ii) labels associated with said operational parameters and said ambient parameters; and
   at an inference stage, applying said trained machine learning classifier to determine whether one or more runtime RF transmissions originate from said RF device.

2. The method of claim 1, wherein each of said training RF transmissions is labelled with said temporally associated operational parameters and ambient parameters.

3. The method of claim 1, wherein said training further comprises generating one or more CFO profiles for said RF device, wherein each of said CFO profiles comprises said calculated CFO values, and wherein said determining is based, at least in part, on calculating a distance metric between a measured CFO value of said runtime RF transmissions and said one or more CFO profiles.

4. The method of claim 1, wherein said operational parameters and said ambient parameters of said RF receiver and said RF device are selected from the group consisting of: Operating temperatures, ambient temperature, ambient relative humidity, RF channel used for transmitting said RF transmissions, and a connectivity state of one or more wireless transceivers.

5. The method of claim 4, wherein said operating temperatures include at least some of Central Processing Unit (CPU) temperature, Graphic Processing Unit (GPU) temperature, and battery temperature.

6. The method of claim 1, wherein at least some of said plurality of operational parameters are initiated in said RF device, based, at least in part, on instructions transmitted from said RF transceiver, wherein said instructions further cause said RF device to transmit at least one training RF transmission during said initiating.

7. The method of claim 1, wherein said machine learning classifier is further trained based, at least in part, on a training set comprising:
   (i) CFO values calculated for at least some of said runtime RF transmission, and
   (ii) labels associated with operational parameters and ambient parameters temporally associated with each of said at least some runtime RF transmissions.

8. A system comprising:
   at least one radio frequency (RF) receiver;
   at least one hardware processor; and
   a non-transitory computer-readable storage medium having stored thereon program instructions, the program instructions executable by the at least one hardware processor to:
      receive, by a radio frequency (RF) receiver, a plurality of training RF transmissions from an RF device, wherein each of said training RF transmissions is temporally associated with operational parameters and ambient parameters of said RF receiver and said RF device;
      at a training stage, train a machine learning classifier based, at least in part, on a training set comprising:
         (i) a Carrier Frequency Offset (CFO) value calculated for each of said training RF transmissions, and
         (ii) labels associated with said operational parameters and said ambient parameters; and
      at an inference stage, apply said trained machine learning classifier to determine whether one or more runtime RF transmissions originate from said RF device.

9. The system of claim 8, wherein each of said training RF transmissions is labelled with said temporally associated operational parameters and ambient parameters.

10. The system of claim 8, wherein said training further comprises generating one or more CFO profiles for said RF device, wherein each of said CFO profiles comprises said calculated CFO values, and wherein said determining is based, at least in part, on calculating a distance metric between a measured CFO value of said runtime RF transmissions and said one or more CFO profiles.

11. The system of claim 8, wherein said operational parameters and said ambient parameters of said RF receiver and said RF device are selected from the group consisting of: Operating temperatures, ambient temperature, ambient relative humidity, RF channel used for transmitting said RF transmissions, and a connectivity state of one or more wireless transceivers.

12. The system of claim 11, wherein said operating temperatures include at least some of Central Processing Unit (CPU) temperature, Graphic Processing Unit (GPU) temperature, and battery temperature.

13. The system of claim 8, wherein at least some of said plurality of operational parameters are initiated in said RF device, based, at least in part, on instructions transmitted from said RF transceiver, wherein said instructions further cause said RF device to transmit at least one training RF transmission during said initiating.

14. The system of claim 8, wherein said machine learning classifier is further trained based, at least in part, on a training set comprising:
  (i) CFO values calculated for at least some of said runtime RF transmission, and
  (ii) labels associated with operational parameters and ambient parameters temporally associated with each of said at least some runtime RF transmissions.

15. A computer program product comprising a non-transitory computer-readable storage medium having program instructions embodied therewith, the program instructions executable by at least one hardware processor to:
  receive, by a radio frequency (RF) receiver, a plurality of training RF transmissions from an RF device, wherein each of said training RF transmissions is temporally associated with operational parameters and ambient parameters of said RF receiver and said RF device;
  at a training stage, train a machine learning classifier based, at least in part, on a training set comprising:
    (i) a Carrier Frequency Offset (CFO) value calculated for each of said training RF transmissions, and
    (ii) labels associated with said operational parameters and said ambient parameters; and
  at an inference stage, apply said trained machine learning classifier to determine whether one or more runtime RF transmissions originate from said RF device.

16. The computer program product of claim 15, wherein each of said training RF transmissions is labelled with said temporally associated operational parameters and ambient parameters.

17. The computer program product of claim 15, wherein said training further comprises generating one or more CFO profiles for said RF device, wherein each of said CFO profiles comprises said calculated CFO values, and wherein said determining is based, at least in part, on calculating a distance metric between a measured CFO value of said runtime RF transmissions and said one or more CFO profiles.

18. The computer program product of claim 15, wherein said operational parameters and said ambient parameters of said RF receiver and said RF device are selected from the group consisting of: Operating temperature of a Central Processing Unit (CPU), operating temperature of a Graphic Processing Unit (GPU) temperature, operating temperature of a battery, ambient temperature, ambient relative humidity, RF channel used for transmitting said RF transmissions, and a connectivity state of one or more wireless transceivers.

19. The computer program product of claim 15, wherein at least some of said plurality of operational parameters are initiated in said RF device, based, at least in part, on instructions transmitted from said RF transceiver, wherein said instructions further cause said RF device to transmit at least one training RF transmission during said initiating.

20. The computer program product of claim 15, wherein said machine learning classifier is further trained based, at least in part, on a training set comprising:
  (i) CFO values calculated for at least some of said runtime RF transmission, and
  (ii) labels associated with operational parameters and ambient parameters temporally associated with each of said at least some runtime RF transmissions.

\* \* \* \* \*